United States Patent [19]

Röhr et al.

[11] Patent Number: 4,936,667
[45] Date of Patent: Jun. 26, 1990

[54] BINOCULAR MICROSCOPE ATTACHMENT FOR CORRECTION OF AMETROPIA

[75] Inventors: Wolf-Dieter Röhr, Regensbur; Helmut Babik, Oberkochen, both of Fed. Rep. of Germany

[73] Assignee: Carl-Zeiss-Stiftung, Heidenheim/Brenz, Fed. Rep. of Germany

[21] Appl. No.: 433,026

[22] Filed: Nov. 7, 1989

Related U.S. Application Data

[63] Continuation of Ser. No. 166,632, Mar. 11, 1988, abandoned.

[30] Foreign Application Priority Data

Mar. 17, 1987 [DE] Fed. Rep. of Germany ....... 3708633

[51] Int. Cl.$^5$ ...................... G02B 21/20; G02B 23/18; G02B 27/00; G02B 7/12
[52] U.S. Cl. .................................. 350/514; 350/515; 350/550; 350/145; 350/257; 351/205
[58] Field of Search .............................. 350/514–517, 350/550–556, 545, 549, 145, 146, 257, 579; 351/205

[56] References Cited

U.S. PATENT DOCUMENTS 3,914,012 10/1975 Boughton ........................... 350/514

FOREIGN PATENT DOCUMENTS 132033 9/1919 United Kingdom ................ 350/579

Primary Examiner—Jon W. Henry
Attorney, Agent, or Firm—Eugene Stephens & Associates

[57] ABSTRACT

An attachment for a binocular microscope to provide appropriate correction for the ametropia, i.e., defective vision, of the user. The attachment includes a pair of holders which can be slipped over and frictionally held by the microscope's scope's binocular eyepiece tubes, each holder having a retainer for receiving and positioning respective eyeglass lenses appropriate for correcting the user's individual ametropia. Means are provided for preventing rotation of the eyeglass lenses when the microscope's binocular tubes are adjusted for the user's interpupillary distance, thereby maintaining the proper orientation of the lenses so that even astigmatism can be corrected. The attachment is applicable to binocular microscopes having oblique eyepiece tubes as well as those having conventional parallel eyepiece tubes.

10 Claims, 3 Drawing Sheets 4,936,667

BINOCULAR MICROSCOPE ATTACHMENT FOR CORRECTION OF AMETROPIA

RELATED APPLICATIONS

This application is a continuation of parent application Ser. No. 166,632, filed 11 Mar. 1988, entitled BINOCULAR MICROSCOPE ATTACHMENT FOR CORRECTION OF AMETROPIA, and abandoned upon the filing of this continuation application.

BACKGROUND OF THE INVENTION

The present invention relates to an attachment for microscope tubes which serves for the correction of ametropia of the user of the microscope.

If an observer with ametropia, i.e., defective eyesight, wishes to use a binocular microscope, for instance an operation microscope, he must take special measures or use auxiliary devices in order to obtain a sharp, high-contrast image.

That is, if the person normally wears eyeglasses and tries to use the microscope without wearing such eyeglasses, the measures to be taken may consist of displacement of the microscope in an axial direction, or the shifting of the eyepiece lenses. However, such measures can not compensate for astigmatic visual defects. Moreover, displacing the microscope in an axial direction in order to correct for ametropia can be successful only if both eyes of the user have the same visual deficiency and if simultaneous observation through the microscope by other persons is not intended.

On the other hand, if persons who need eyeglasses try to wear them when using a binocular instrument, they have difficulty getting their eyes close to the eyepiece tubes, and they are troubled by stray light if they cannot accommodate their eyeglass frames to the rubber cups at the viewing ends of the tubes. Also, to permit observers to wear their own eyeglasses, the eyepiece must be so designed that the exit pupil can be brought into the pupil of the eye of the observer. The disadvantage of this solution is that there are different spectacle-frame constructions which may have different distances between the corneal vertex and the eyeglass lenses, so that the required position of the pupil is not obtained and the visual fields may be trimmed in disturbing fashion.

SUMMARY OF THE INVENTION

The object of the present invention is to correct for an individual's ametropia (including astigmatism) by permitting the easy and rapid attachment of the user's individual means of correcting his ametropia—namely his eyeglass lenses—to the binocular microscope tube or the eyepiece thereof.

In accordance with the invention, this object is achieved by providing an attachment which is adapted to be readily slipped over and frictionally supported by the eyepiece tubes of the microscope. This attachment includes a pair of holders, each of which can be received over a respective one of the microscope's eyepiece tubes and each of which is equipped with a receptacle for the respective eyeglass lenses of the user. These holders are interconnected by telescoping means for preventing the rotation of the eyeglass lenses relative to each other when the holders are rotated with the eyepiece tubes of the microscope as those tubes are adjusted for the interpupillary distance of the user. Also, the holders position the user's eyeglass lenses at substantially the same distance from the viewing end of the holders as would be the distance between the lenses and the eyes of the user if the lenses were mounted in the frame of eyeglasses being worn by the user.

In one suitable embodiment of the invention, the telescoping means comprises a rod displaceable longitudinally within a sleeve or tube, and pins fastened to the ends of the bar move in grooves in the respective eyeglass lens receptacles.

If the attachment is to be fastened to a microscope having oblique binocular tubes, then the pins fastened on the ends of the telescopic bar are arranged turnably on the bar.

Other developments of the invention can be noted as the description proceeds.

The advantages obtained with the invention include, in particular, the fact that the attachment can be easily slipped over binocular eyepiece tubes and thus the user can have a readily available and preadjusted correction for his individual defective vision. Also, by virtue of the telescoping means, adjustments to the microscope to set the interpupillary distance do not affect the dioptric power or axial orientation of the individual's eyeglass lenses. In this way the attachment device of the invention is particularly suitable for binocular tubes having a co-viewing device such as used in modern surgery.

BRIEF DESCRIPTION OF THE DRAWINGS

Exemplary embodiments of the invention are illustrated in the accompanying drawings, in which.

DETAILED DESCRIPTION

Figure 1:
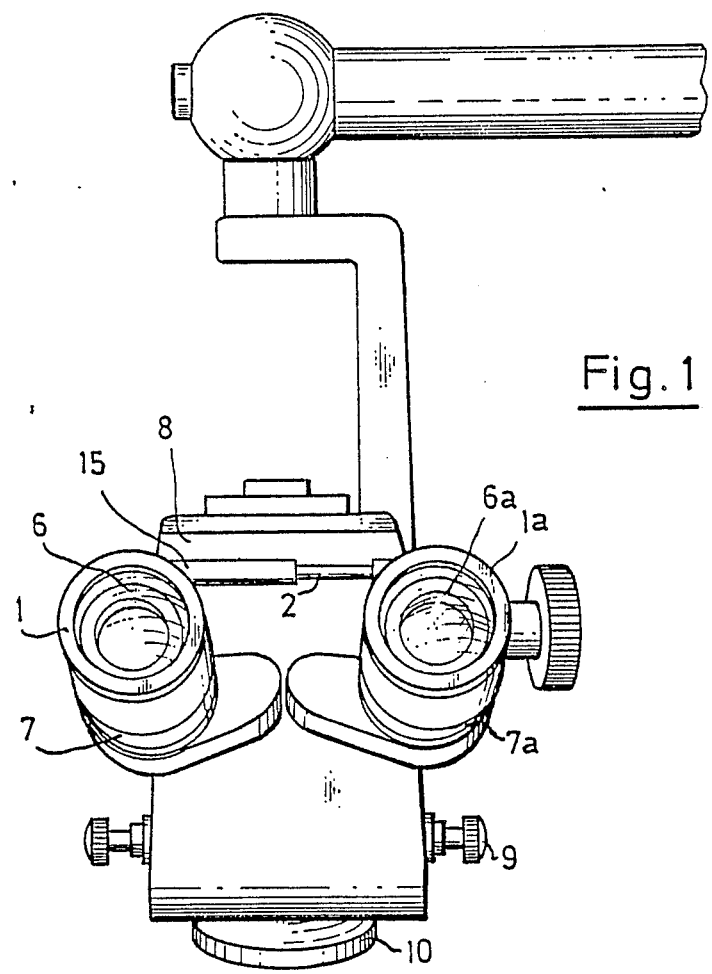
FIG. 1 is perspective view of a binocular microscope equipped with the attachment according to the invention.

FIG. 1 shows the principal parts of a conventional binocular microscope, such as is used, for example, in surgical operations, with the attachment of the present invention applied thereto. The usual binocular body of the operation microscope is shown at 8, and it is equipped with the left and right binocular eyepiece tubes 7 and 7a, the interpupillary distance of which is adjustable by turning the adjustment knob 9. The objective of the microscope is indicated at 10.

Figure 2:
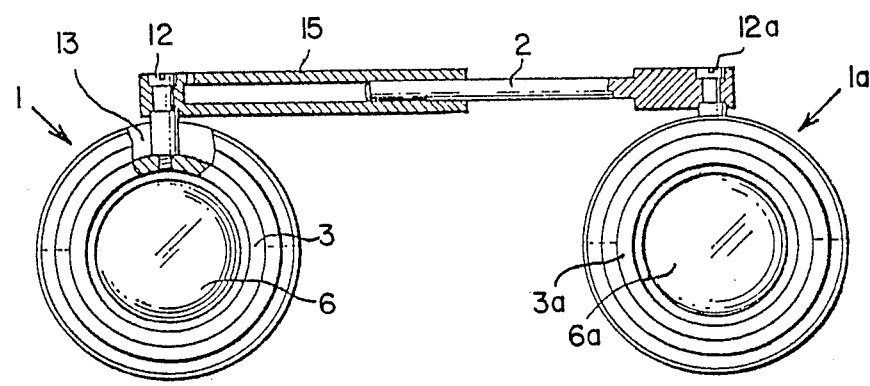
FIG. 2 is a plan view of the attachment according to the invention, viewed from the direction of the plane II—II of FIG. 3, with parts broken away and parts in section.

According to the invention, the holders 1 and 1a are slipped over and frictionally mounted on the respective eyepiece tubes 7 and 7a, and are connected to each other by the telescopic bar comprising the rod 2 slidable within the sleeve 15. As can be best seen in FIGS. 2 and 3, holders 1 and 1a, which are shown separated from the microscope, each has a viewing end or front edge 14 and 14a and a tube-receiving end 17 and 17a formed as a flange made resilient by means of slots 18 and 18a. These flanges may be slipped over the viewing ends of binocular eyepiece tubes 7 and 7a where they are retained frictionally in place, maintaining the longitudinal axis of each holder in alignment with the longitudinal axis of the respective binocular eyepiece tube.

Positioned near the viewing end of holders 1 and 1a are respective receptacles 3 and 3a which are designed to receive and retain the respective eyeglass lenses 6 and 6a used for correcting the user's ametropia, the lenses being maintained in viewing planes perpendicular to the longitudinal axes of the holders. These eyeglass lenses have whatever characteristics are needed for correction of the ametropia of the individual user, and may include cylindrical, spherical, or other appropriate surfaces or shapes needed for correction of the vision defects of the person using the microscope.

The sleeve 15 of the telescopic bar 2/15 is located at a distance from the upper or front edges 14, 14a of the receivers or holders 1, 1a which corresponds to the distance that would normally exist between an eyeglass frame and the eye and nose of the person whose lenses have been mounted in receptacles 3 and 3a. The observer is therefore in no way impeded by the telescopic bar. Pins 12, 12a extend from the ends of the telescopic bar into grooves 13, 13a extending circumferentially around all or at least part of the respective circumferences of the holders 1, 1a. When the interpupillary distance is adjusted, the pins 12, 12a move in these grooves.

Figure 4:
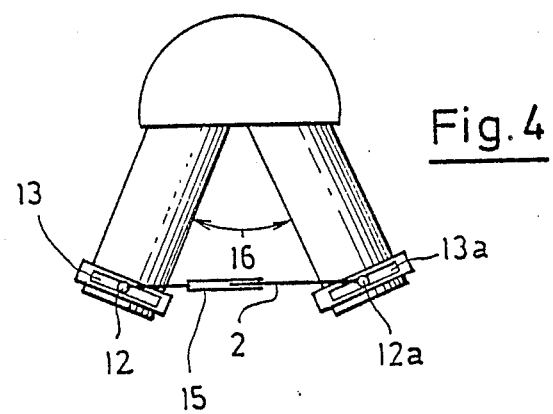
FIG. 4 is a schematic view showing the application of the attachment of the invention to a oblique binocular tube.

FIG. 4 shows the use of the attachment of the present invention on a microscope eyepiece of the oblique type. The eyeglass lens holders of the present invention are slipped over the ends of the oblique eyepiece tubes of the microscope, just as they are slipped over the ends of the parallel eyepiece tubes in FIG. 1. However, on an oblique tube microscope, the longitudinal axes of the eyepiece tubes (and of the eyeglass lens holders attached thereto) do not remain parallel with each other during adjustment of the interpupillary distance, but rather they are spread apart or closer together, varying the angle 16 in FIG. 4. Therefore the pins 12, 12a are turnably mounted in the slots 13, 13a in order to permit this angular change when the interpupillary distance is adjusted.

Figure 5:
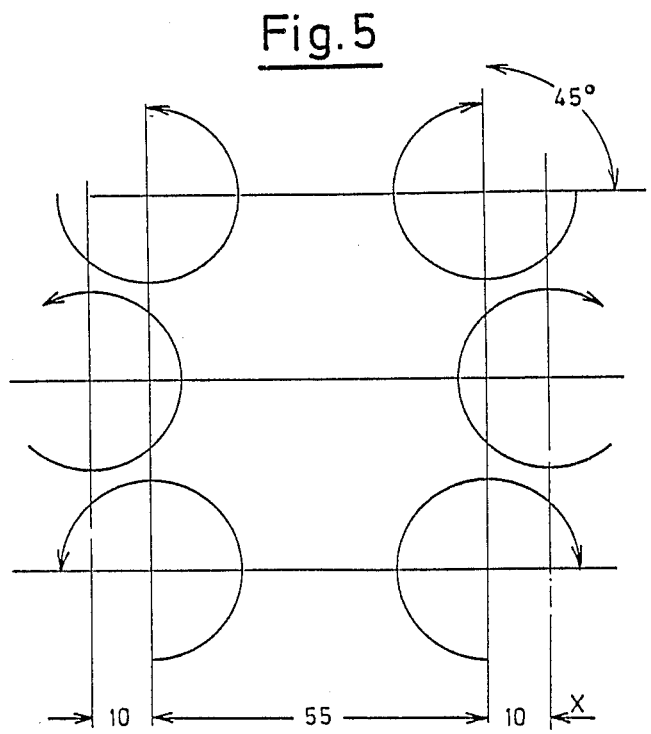
FIG. 5 illustrates the movement of the individual eyepieces upon an adjustment of the interpupillary distance effected on the binocular tube.

From the showing of FIG. 5, the rotary movement of the eyepieces upon adjustment of the interpupillary distance between the microscope's tubes can be noted. As shown, the interpupillary distance is continuously variable between 55 mm and 75 mm. With an interpupillary distance variation of 25 mm the eyepieces turn through an angle of 45 degrees around their optical axis.

If the eyeglass lenses 6, 6a of the user contain cylindrical components or if for any reason these lenses need to be oriented in a particular way with respect to the eyeglass axis, the eyeglass lenses are provided with a mark to indicate the horizontal spectacle axis, and the holders 1, 1a are also provided with such a mark, so that the lenses may be mounted in proper position in the holders.

Figure 3:
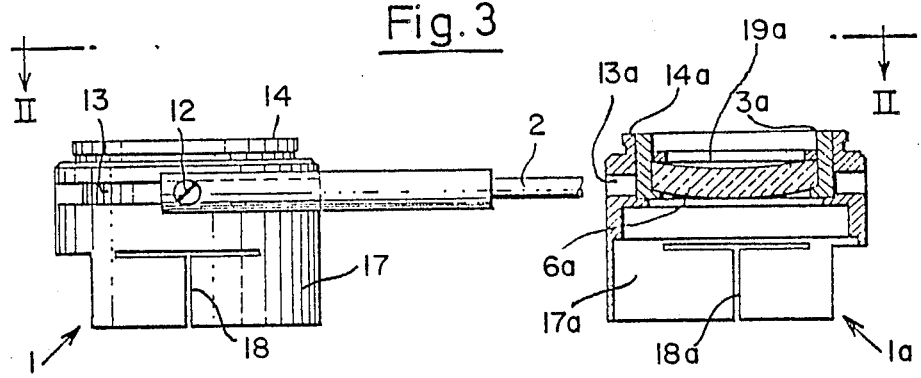
FIG. 3 is a view of the parts shown in FIG. 2, viewed in a direction at right angles to the direction of viewing in FIG. 2, with parts broken away and parts in longitudinal section.

A respective retainer ring 19a is provided for fixing each eyeglass lens 6, 6a in the receptacles 3, 3a, as plainly seen in FIG. 3.

If the sleeve 15 is of metal, as is preferably the case, the sleeve is provided with a coating, preferably of a plastic material which is agreeable to contact with delicate skin of the face, preferably applied by a conventional plastic foaming process. Any known plastic material may be used.

What is claimed is:

1. An attachment for a binocular optical instrument to permit a user normally requiring eyeglasses for ametropia to obtain a sharp, high-contrast image of an object being observed through binocular eyepiece tubes of said instrument when not wearing said eyeglasses, said attachment comprising:
   a pair of holders, each having a viewing end, a tube-receiving end, and a longitudinal axis, said tube-receiving ends being adapted to be slipped over and frictionally attached respectively to said eyepiece tubes to position the longitudinal axis of each holder substantially coincident with the longitudinal axis of each respective eyepiece tube, said holders also being interconnected by telescoping means; and
   receptacles carried by said holders for receiving and retaining eyeglass lenses corresponding to those normally used in the user's eyeglasses, said receptacles being located near said viewing ends of each of said holders to position said lenses in viewing planes perpendicular to the longitudinal axes of the holders at substantially the same distance away from each respective viewing end as would be the distance between said lenses and the eyes of the user if said lenses were mounted in the frame of eyeglasses being worn by said user, said receptacles also being interconnected with said telescoping means for preventing rotation of said receptacles in said viewing planes when the holders are rotated with said binocular eyepiece tubes as the tubes are adjusted for the interpupillary distance of the user.

2. The attachment defined in claim 1, wherein said telescopic means comprises a rod (2) longitudinally displaceable in a sleeve (15).

3. The attachment defined in claim 2, wherein said rod is connected to one of said holders and said sleeve is connected to the other of said holders.

4. The attachment defined in claim 2, wherein said sleeve and rod are connected to said holders by respective pins (12, 12a) engaging respective grooves (13, 13a) in said respective holders.

5. The attachment defined in claim 4, wherein said pins are turnable with respect to said telescopic means.

6. The attachment defined in claim 1, wherein said receptacles are provided with a mark to indicate a horizontal eyeglass axis so that said eyeglass lenses may be correctly oriented therein.

7. The attachment defined in claim 6, further comprising retainer rings for fixing said eyeglass lenses (6, 6a) in said receptacles (3, 3a).

8. The attachment defined in claim 2, wherein said sleeve is of coated metal.

9. The attachment defined in claim 8, wherein said coating consists essentially of plastic material.

10. The attachment defined in claim 1, wherein the tube-receiving end of each said holder comprises a resilient flange for encircling at least part of the circumference of said eyepiece tube and for gripping the tube frictionally.

* * * * *